United States Patent

[11] 3,593,584

| [72] | Inventors | Victor Dudick<br>Middletown;<br>Richard A. Gerlach, Lancaster, both of, Pa. |
|---|---|---|
| [21] | Appl. No. | 804,806 |
| [22] | Filed | Mar. 6, 1969 |
| [45] | Patented | July 20, 1971 |
| [73] | Assignee | Jack Solomon<br>Harrisburg, Pa. |

[54] AUTOMATIC TESTING UNITS FOR PIPE FITTINGS
8 Claims, 8 Drawing Figs.

| [52] | U.S. Cl. | 73/45.1 |
| [51] | Int. Cl. | G01m 3/26 |
| [50] | Field of Search | 73/45, 1, 49.1, 41, 45.2 |

[56] References Cited
UNITED STATES PATENTS

| 2,551,020 | 5/1951 | Laxo | 73/45.2 |
| 2,985,008 | 5/1961 | Renard | 73/45.2 |
| 3,135,575 | 6/1964 | Breidenbach et al. | 73/45.1 X |

Primary Examiner—Louis R. Prince
Assistant Examiner—William A. Henry, II
Attorney—Sherman and Shalloway ABSTRACT: A new and improved testing system for pipe fittings including a battery of testing blocks into which fittings to be tested are placed, a battery of piston-cylinder units for holding the fittings in the blocks for a controlled period of time, a metering device for administering over a controlled period of time, fluid interior of the fittings and to a pressure-sensing unit. The sensing unit is then isolated by the metering device and upon a pressure change occurring in the sensing unit, a trapdoor is raised adjacent the testing block associated with the unit sensing a pressure change. A battery of kickout units then ejects the fittings being tested with the fittings of the blocks producing a pressure change being trapped as rejects.

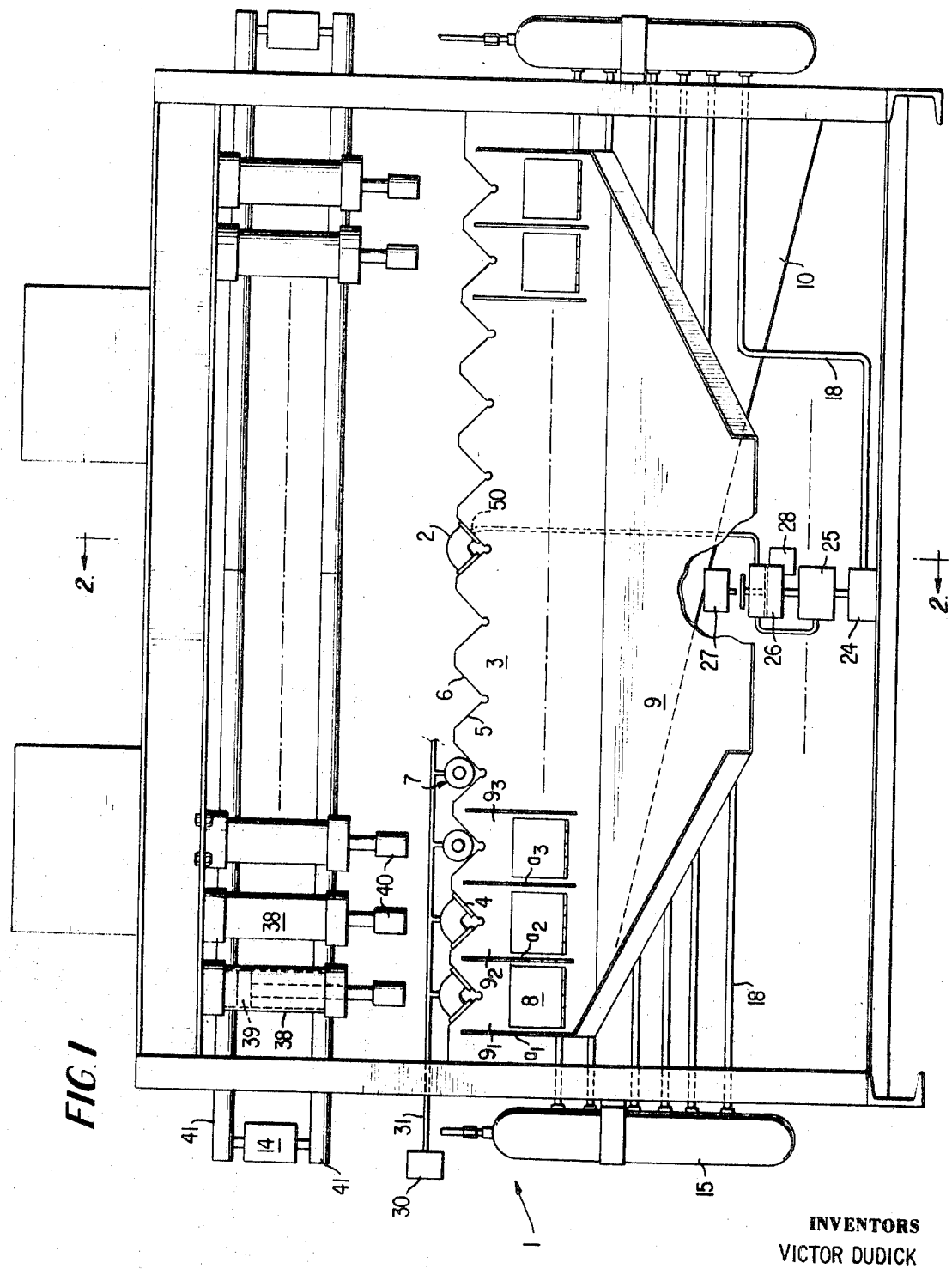

INVENTORS
VICTOR DUDICK
RICHARD GERLACH

BY *Sherman F. Shalloway*

ATTORNEYS

AUTOMATIC TESTING UNITS FOR PIPE FITTINGS

BACKGROUND OF THE INVENTION

This invention relates to a testing system and more particularly to a system for testing pipe fittings by sensing the leakage of fluid pressure from the fittings and selectively rejecting defective fittings.

In pressure testing systems utilized in the past, it is conventional to establish a pressure within an article and then to determine whether any fluid leaks from the article. When the article comprises a cylindrical element such as a can or a pipe or a pipe fitting, it is conventional to attach a conduit to the opened parts of the article and to a pressure-sensing device such as a movable diaphragm. In use, the system establishes equivalent pressures on either side of the diaphragm, and any leakage from the system will destroy the stability originally present due to the equalized pressure, thus causing the diaphragm to move. This physical movement is easily converted to an electrical impulse which is again converted to a physical movement in the form of a dial which can be read. Other systems have utilized means to develop equalized pressures in a system and to cause some element called a sensor to be activated when the pressure within the closed system changes due to leakage. The leakage corresponds to a defective article, and by using conventional testing equipment defective articles may be ejected while suitable articles are further processed by filling, etc. It is obvious that pressure-testing systems must have a means for admitting a predetermined volume of fluid to the system and to thereafter seal the system effectively against leakage in order to achieve the desired results of testing the article.

While these prior art systems are effective, they have certain drawbacks. Among these drawbacks are the unavailability of a suitable device for administering fluid to both sides of the diaphragm or to the sensing system in such a controlled manner as to not injure the diaphragm or sensing unit. An immediate inrush of fluid to the system as results from a mere open and shut valve is undesirable since it results in large fluctuations in the sensor and premature deterioration of the system. Manually controlled devices for controlled administration of fluid to the system are undesirable since they occupy an uneconomical amount of labor.

A further major drawback of the prior art systems is the unavailability of a unit that can automatically, and with minimum attention, test a plurality of fittings, etc., so as to occupy a minimal amount of labor.

BRIEF DESCRIPTION OF THE INVENTION

The present invention overcomes to a major degree the drawbacks of the prior art noted above. The invention provides a complete pipe-fitting testing system that requires a single operator to test 24 fittings for each controlled testing period as well as a metering device that administers fluid to a sensing unit over a controlled time cycle.

The system of this invention includes a battery of testing blocks on which are placed pipe fittings, the pipe fittings being held in airtight relation to the blocks by a holddown assembly including a cylinder and piston overlying each testing block which presses against the fittings. A timer system controls the length of time during which the holddown assembly is actuated. Communicating with the testing block is a source of fluid under pressure which is applied to the fittings placed in the blocks for a period of time until the system stabilizes and for an additional period of time during which the testing takes place. Fluid under pressure is passed to a metering device through a three-way control valve. The control valve is regulated in response to a timing system such that fluid passes to the metering device, a predetermined time after the system is actuated. The metering device is constituted in a valve assembly having a two-headed piston: a small piston head at one end and at the opposite end, a larger piston head. These pistons are arranged in a stepped cylinder opposed to the heads of the two pistons. Fluid also passes from the smaller portion of the stepped cylinder to the pipe fittings through the testing blocks and to one side of a diaphragm of a sensing device as well as to an accumulator and the other side of the diaphragm of the sensing device. As fluid is administered to the metering device, the pressure on the larger piston head overcomes the pressure on the smaller piston head and moves the piston toward the end of the smaller portion of the stepped cylinder. This movement takes place over a controlled period of time and simultaneously permits the sensing unit to become balanced in a smooth and controlled manner. Once the pressure on the larger cylinder head overcomes the pressure of the smaller cylinder head, and the piston moves all the way to the smaller portion of the stepped cylinder, the system is sealed off and the sensing device is in a balanced state. The sensing device then tests for a period of time controlled by an electrical timer and if any fluid escapes from the pipe fitting, the diaphragm becomes imbalanced and actuates an electrical circuitry. The electrical circuitry will not activate prior to the testing period since it is not energized until an electrical timer meters sufficient time for the system to become balanced. If the diaphragm moves to actuate the electrical system, a trapdoor is opened immediately adjacent the testing blocks associated with the particular sensing unit. The holddown pistons are then released and ejecting pistons are actuated which eject all the fittings being tested, the fittings determined defective being caught in the open trapped doors and passed to a reject chute while the good fittings are permitted to pass on for further processing.

Consistent with this brief description, it is a primary object of this invention to provide a pipe-testing system that is fully automatic and requires minimum operator time.

It is another object of this invention to provide a testing system that is fully automatic and operates in a controlled time relation.

It is a further object of the invention to provide a testing system including a battery of testing blocks which automatically passes acceptable fittings while selectively rejecting defective fittings.

It is still a further object of the invention to provide a testing system having a pressure sensitive unit which is pressurized and stabilized for a controlled time interval and then isolated for an additional time interval during which additional time testing takes place.

It is a more specific object of the invention to provide a testing system wherein initial actuation starts a plurality of operations in time sequence including securing fittings in testing blocks, administering fluid to a metering device, metering fluid to a sensing unit including the fitting and one side of a diaphragm jointly over a controlled period of time to create a balance system, isolating the system, opening a reject chute adjacent each block whose associated sensing unit becomes imbalanced, releasing the fittings and kicking the fittings out of the block with selective fittings being caught in the reject chute, and shutting down the system.

It is yet another object of the present invention to provide a system having an automatically operating metering device adapted to admit a predetermined volume of fluid to a pressure testing system and to automatically isolate the system.

Another object is to provide a system having a metering device utilizing a movable piston which admits fluid to one side of the piston at a varying rate from the rate of admission to the opposite side of the piston.

A further object is to provide a system having a metering valve which may quickly release an established line pressure in an isolated system.

These and other objects and advantages of the present invention will become apparent from a reference to the following description and drawings.

BRIEF DESCRIPTION OF THE DRAWINGS

FIG. 1 illustrates the system in partial front elevation;

DESCRIPTION OF PREFERRED EMBODIMENT

Figure 7:
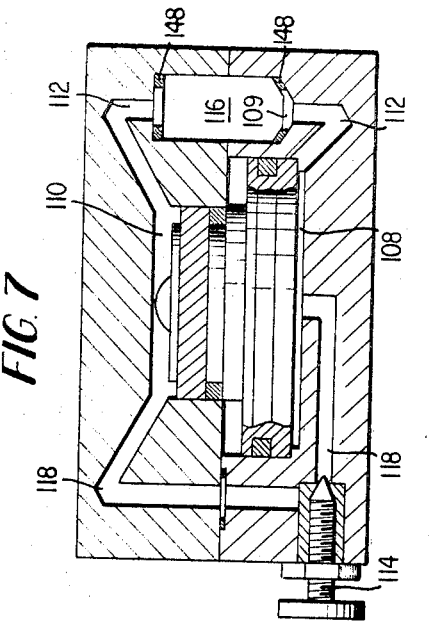
FIG. 7 represents a sectional view taken along lines 7-7 of FIG. 5.
Figure 8:
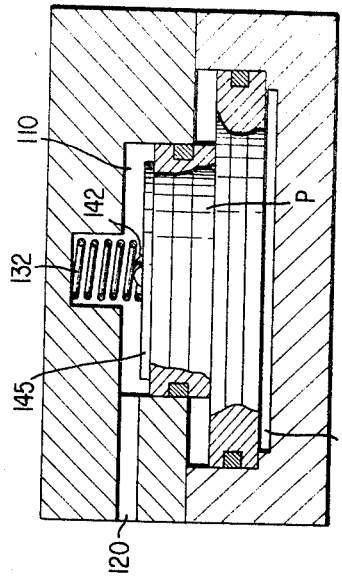
FIG. 8 represents a sectional view taken along lines 8-8 of FIG. 5.

Referring now to FIG. 1, therein is shown a preferred embodiment of the invention, the pipe-testing system being designated generally at 1. Pipe fittings 2 are shown positioned in the testing blocks generally designated at 3. The system illustrated shows a battery of 12 testing blocks, any desired number of testing blocks being permissible, and is illustrated with particular reference to the testing of "elbows," i.e., a 90° pipe fitting. The system could obviously be modified within the scope of the invention to test pipe sections of other shapes, it being necessary merely to construct a testing block adapted to receive the particular type fitting and the holddown pistons to the necessary configuration.

The testing blocks are illustrated in V-shape to receive the fittings to be tested legs 5 and 6 of each V-shaped block receiving the respective end of the fitting. Between each leg of the testing block and the fitting is positioned a pad 4 for securing an airtight union between each face of the fitting and each leg of the V-shaped testing block.

Positioned above each testing block is a holddown assembly, including a battery of piston-cylinder units. Each unit is designated generally as 11, the unit having a cylinder 38 in which is situated a piston 39 for axial movement therein. The piston is provided with a head 40 which, upon downward movement of the piston, operates to secure the fitting in the testing block and ensure an airtight union between the fitting and the testing block.

Air is supplied to the holddown assembly 11 through a four-way holddown and return valve 14 which supplied manifolds 41 that are connected to the upper and lower portions of the cylinders 38. The top manifold 41 operates to supply air simultaneously to a battery of six of the cylinders 38 at the upper portion of the cylinder to actuate the holddown assembly. Pressure is maintained in the top of the cylinder 38 throughout the running of the testing cycle to maintain the fitting in proper position in the testing block. Upon completion of the testing cycle, electrical control circuitry operates the holddown and return valve to exhaust the air from the upper portion of the cylinder 38 while supplying air through the lower manifold 41 to drive the piston 39 upwardly and relieve the pressure of the piston head from the testing unit.

Figure 2:
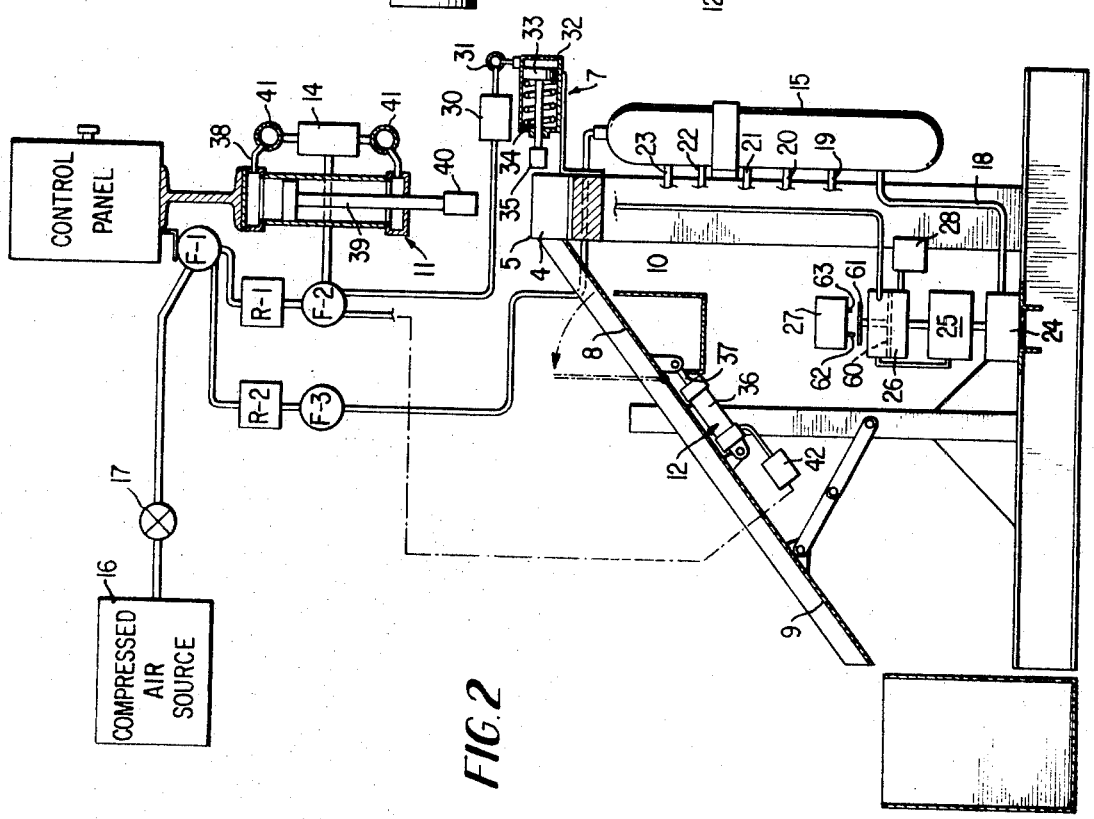
FIG. 2 illustrates a sectional view of the system along line 2-2 of FIG. 1.

Referring now to FIGS. 1 and 2, each individual testing block is provided with a separate testing assembly, each assembly being alike and only one assembly being shown for the sake of clarity. The testing assembly includes an accumulator 15 which is supplied with compressed air and which in turn supplies air to the three-way control valve 24 of each assembly through conduits 18-23. The valve 24 after a predetermined time interval supplied air to the metering device 25. The metering device 25 is unique in itself and will be described later in conjunction with FIG. 6-9, the description here being limited to the operation of the metering device in the system.

The metering device 25 communicates with the sensing unit 26 and operates to supply pressurized fluid to the sensing unit in a controlled manner. The sensing unit 26 includes a diaphragm 60 to which is connected an actuating plate 62. Simultaneously, the metering device supplies fluid to the portion of the sensing unit below the diaphragm as well as to a stabilizing accumulator 28. At the same time, fluid is supplied to the portion of the sensing unit above the diaphragm and to each individual testing block 3 which permits air to pass throughout at 50 to the interior of the fitting to be tested. The metering device supplies fluid to the sensing unit over a controlled period of time and after the predetermined period, the sensing unit is isolated. When the sensing unit 26 is isolated, the diaphragm will be in a balanced state having equal pressure on both sides thereof as well as in the fitting and the stabilizing accumulator.

Once the sensing unit is isolated, the testing interval begins and if there is a leak of pressure from the testing unit, there will be an imbalance of the diaphragm since each side of the diaphragm is isolated from the other through the metering device. A leak in the fitting will operate to reduce the pressure on the upper side of the diaphragm 60 and cause the actuating plate 61 to move upwardly and actuate the microswitch assembly 27.

The microswitch assembly 27 has first and second sensing elements 62 and 63, respectively. Sensing element 62 is positioned closer to the actuating plate than sensing element 63 such that movement of the actuating plate will initially depress sensing element 62 and further movement of the actuating plate will operate to depress sensing element 63. Of course, if there is no leak in the fitting being tested, the diaphragm will remain stable, the sensing unit balanced and there will be no movement of the actuating plate 61 to depress either of the sensing elements 62 or 63.

If the fitting being tested does have a leak, the actuating plate 61 will move upwardly to initially depress sensing element 62. Sensing element 62 energizes controlled circuitry which actuates three-way trapdoor valve 42 associated with the testing block of the particular testing assembly.

When valve 42 is actuated, it supplies pressurized air to the trapdoor actuating assembly 12. Assembly 12 includes a cylinder 36 and piston 37. Each assembly 12 is associated with a trapdoor 8 positioned directly beneath and adjacent the particular testing block of the subject testing assembly. When valve 42 is actuated, it supplies air to the base of the cylinder 36 to force the piston 37 outwardly of the cylinder, the outward movement of the piston 37 operating to raise the trapdoor 8. Pressure is maintained in the base of the cylinder 36 to hold the trapdoor 8 open through the remaining period of the testing cycle.

The above described operation of the testing assembly operates in conjunction with each of the battery of the testing blocks 3 so that through this stage of the testing cycle, the trapdoor associated with each of the testing assemblies and each particular testing block will be either in the up or open position or lying flat depending upon whether or not the fitting being tested is determined defective by the sensing unit.

The next step of the testing operation is a release of the holddown down assembly 11 which is actuated by valve 14 as aforedescribed valve 14 being controlled by a timer. Immediately after the holddown assembly is released and the pistons 39 are simultaneously raised, kickout valve 30 is actuated by a timer.

Actuation of valve 30 operates to supply air to manifold 31 which in turn supplies air to the kicker assembly 7 associated with each of the testing blocks 3. A battery of 6 of the kicker assembles 7 are supplied by the manifold 31 to be actuated simultaneously. The kicker assembly 7 includes a cylinder 32 and piston 33 as well as a return spring 34. Connected to the end of piston 33 is head 35 and when air is supplied to the base of the cylinder 32, it forces the piston 33 outwardly of the cylinder and the head 35 into contact with each fitting 2 positioned within the testing blocks 3. When the fittings 2 are hit by the head 35 of the kicker assembly 7, they are ejected from the respective testing blocks 3 toward the slide 9.

As is clearly shown in FIG. 1, the slide 9 is divided by partitions, $a_1$, $a_2$, $a_3$, etc., and into slide portions $9_1$, $9_2$, $9_3$, etc., immediately below and adjacent the respective testing blocks 3.

Where a fitting being tested in one of the blocks 3 has been found defective by the testing assembly, and the trapdoor associated with that particular testing block has been raised as shown in phantom lines of FIG. 2, the fitting will be blocked from passing through the slide portion associated with that testing block and will accordingly fall through the opening left by the raised trapdoor into the reject chute 10. Passing into the reject chute 10, the fitting will slide downwardly through the chute to a bin for collecting the rejected fittings.

If the fitting associated with a particular block has been tested and proved not defective, the trapdoor associated with that particular testing block will not be raised and thus the fitting will pass through the particular chute portion associated with that testing block down through chute 9 into a bin for collecting the flawless fittings.

If the trapdoor has been raised, the valve 42 is provided with a flow restrictor so that when the system is shut down, the piston will not immediately retract and close the trapdoor. Thus, the trapdoor remains open for a short period after the testing cycle has run so that the fitting can pass into the reject chute as desired.

Although not shown in the drawings, a particularly advantageous arrangement of the testing system of the invention is to provide two of the 12 station testers in back to back relation with an isle therebetween so that one operator can effectively test 24 fittings in the course of each testing cycle. In this arrangement, the operator would place fittings in each of the 12 stations of one of the testing units and then depress the "start" buttons to initiate the testing cycle. Then, he would turn and commence to place fittings in the 12 station of the opposed testing unit and initiate the testing cycle. While the fittings are being placed in the second unit, the cycle of the first unit will be nearing completion such that shortly after the second unit has been started, the first unit will again be ready to test a new group of fittings. By arranging the testers of the invention in this manner, 24 fittings can be tested during the course of a testing cycle with minimum effort and attention to the testing units.

Figure 3:
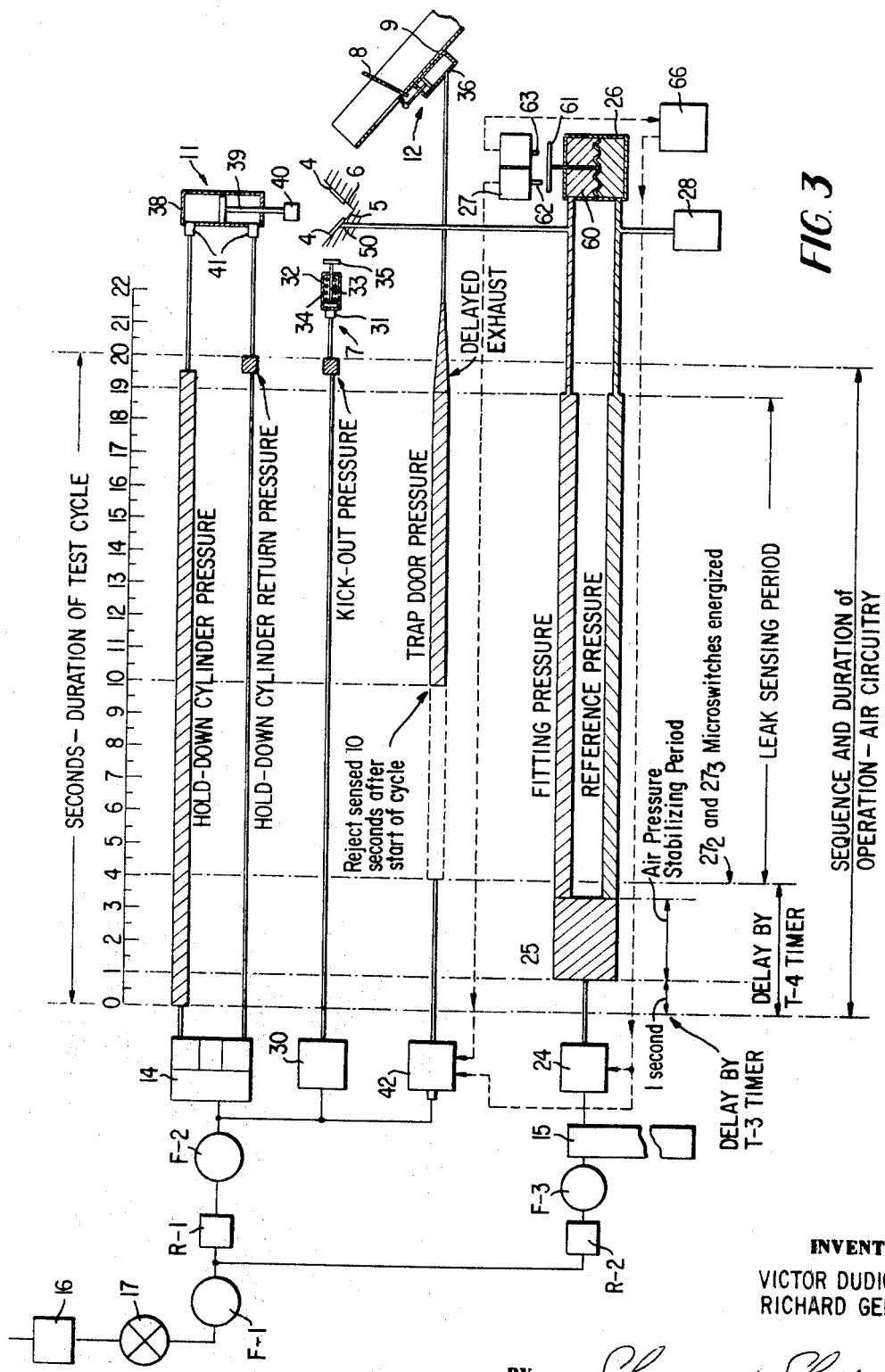
FIG. 3 illustrates the invention in schematic in conjunction with a time sequence chart.

Referring now to FIG. 3, therein is shown the testing unit of this invention in block diagram with piping arrangements and a chart of the sequence and duration of the operation of the air circuitry to illustrate graphically the working relationship of all components. Air is piped from the compressed air source 16 through a shutoff valve 17 to a 50 micron filter F-1. One takeoff from the 50 micron filter is piped to an air pressure regulator R-1 for regulation of air pressure applied to the holddown assembly, kickout assembly and trapdoor assembly for a battery of six of the total of 12 tester blocks or work stations. In this connection, it can be visualized that the testing unit in this invention is divided into two channels, channel A and channel B, each of the channels A and B operate to control six of the holddown assemblies and kickout assemblies. Each tester block of the respective channels is further provided with a tester assembly including a sensing unit air valve, a metering device, a sensing unit, and an arrangement for throwing open the trapdoor associated with each tester block.

From the pressure regulator R-1, the air is next piped through the oil-fog, air lubricator F-2. Lubricator F-2 lubricates the internal parts of the valves and cylinders through which the air passes. This lubrication keeps the valves and cylinders working freely and helps to minimize wear.

From the lubricator F-2 air is supplied to the four-way holddown and return valve 14 which supplies air to six of the holddown assemblies through the manifold common to those assemblies. Once the testing cycle is started, the valve 14 is electrically energized so that the holddown pistons 39 are extended to apply pressure to the fittings in the testing blocks. Air is also supplied from the lubricator F-2 to the kickout valve 30 which in turn supplies pressure to the manifold 31 for actuating the kickout assembly for each of a battery of six of the testing blocks associated with the particular channel being actuated. Even though air is supplied to the kickout valve 30, this valve is not energized immediately but controlled by a time delay. Thus, since the valve is not electrically energized, the kickout piston 33 remains in retracted position due to the pressure of the spring 34 so that the fittings will remain in the testing blocks until the testing cycle is near completion.

Air is supplied also through lubricator F-2 to six of the trap door actuating assemblies. Thus, air for each of the individual trapdoor assemblies is supplied through the three-way valve 42 which controls the trapdoor assembly.

A second takeoff from the 50 micron filter F-1 is piped to a second air pressure regulator R-2 and a 5 micron filter F-3 to provide independently regulated extremely clean air to the air accumulator 15 for leak-sensing purposes. The diaphragm in the sensing unit 26 is extremely sensitive and its accuracy may be adversely affected by a deposit of oil or dirt on its surface. Two such accumulators 15 are used per tester, each servicing one channel of six work stations or testing assemblies with a stable volume of air pressure for charging the metering device through six semiindependently controlled sensing unit air valves 24.

The piping of the metering device and sensing air circuitry starts at the accumulator 15. Air is piped independently to each of the six three-way control valves 24 of the testing assemblies of the channel being fed by the accumulator 15. Describing now only one of the testing assemblies, each assembly associated with the individual testing blocks operating in the same manner, air is supplied by the three-way control valve 24 after a 1 second time delay to the metering device 25. The three-way control valve 24 is controlled by a timer which operates to delay the feeding of air to the metering device for a 1 second period in order to assure that the fittings are securely positioned in the testing blocks by the holddown assemblies 11.

Air supplied to the metering device 25 is then piped to two independent circuits: (1) the stabilizing accumulator 28 and the Hi side of the sensing unit, i.e., the portion of a sensing unit below the diaphragm 60; (2) to the fitting 2 being tested and to the lo side of the sensing unit, i.e., the portion of the sensing unit above the diaphragm 60.

Each trapdoor air valve 42 is controlled independently by microswitches in the microswitch assembly 27. This control is shown on the chart by broken lines and the valve 42 may be energized electrically at any time during the leak-sensing period which is shown on the chart as between 4 and 19 seconds after start of the testing. The drawing illustrates a leak sensed and the trapdoor air valve 42 energized at 10 seconds of the test cycle. The valve 42 is controlled by a delay timer, timer T-2 to be described in conjunction with the electrically control circuitry of FIG. 4, such that the valve 42 may not actuate the trapdoors until the 4 second delay has passed. Since the timer T-2 ends its cycle at 19 seconds, some delay in the closing action of the trapdoor must be introduced to keep the trapdoor open long enough to trap the rejected fittings 2 which will be kicked out of the testing blocks at 20 seconds or the end of the testing cycle. This is accomplished by the use of a standard and properly adjusted exhaust silencer or flow restrictor connected to the exhaust of the kickout valve.

The tester of this invention is provided with an electrical system to operate the air valves and control the timing sequence and duration of the operation and air circuitry. The metering device 25, however, is controlled entirely pneumatically by virtue of the unique construction of the device to be described with reference to FIGS. 5 to 8.

OPERATIONAL SEQUENCE

Figure 4:
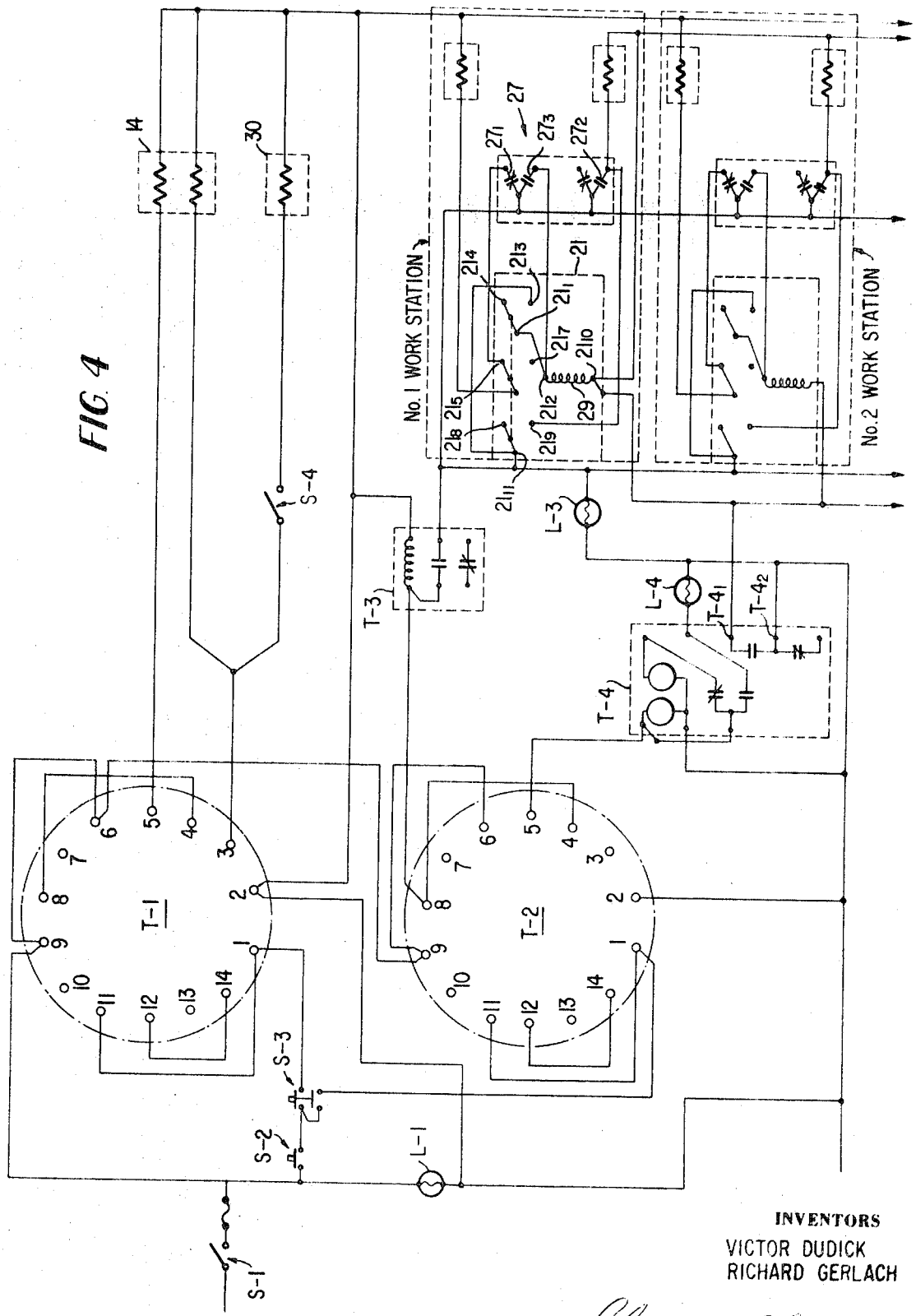
FIG. 4 illustrates a schematic of a wiring system for the invention.
Figure 5:
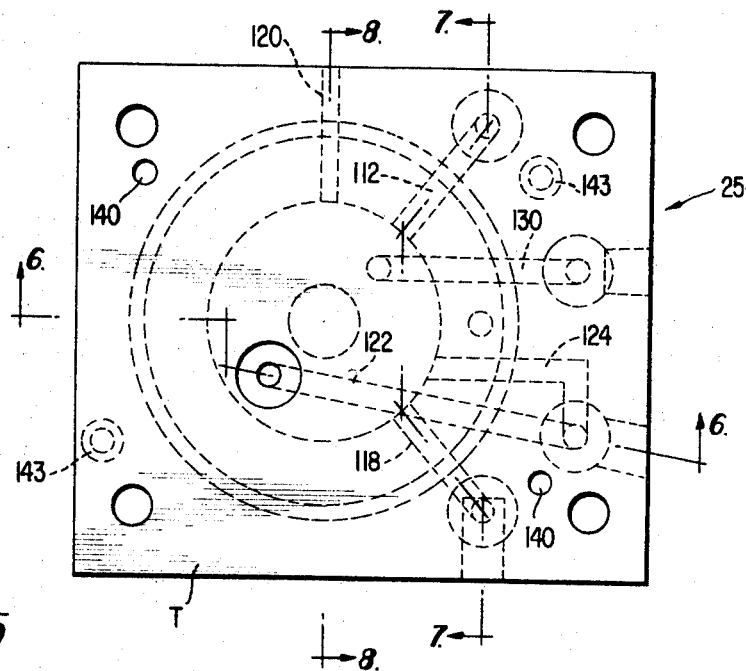
FIG. 5 illustrates a top view of the control valve of the present invention.
Figure 6:
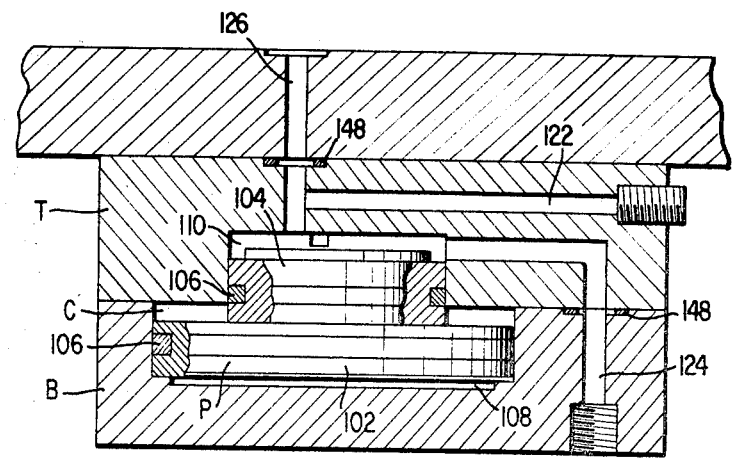
FIG. 6 illustrates a section view taken along lines 6-6 of FIG. 5.

Referring to FIGS. 3 and 4, with the main switch S-1 "on" and the power switches on both control panels also switched "on" the operator is required to push both "start" pushbuttons S-2 and S-3 on a control panel to start the test cycle. Two "start" push buttons are utilized requiring the use of both hands of the operator as a safety feature.

The "start" push buttons energize timers T-1 and T-2. Since timer T-1 controls the holddown cylinders and the kickout cylinders, it should always be set back for a test cycle duration 1 second longer than timer T-2. This is to maintain physical pressure on the fittings until after the internal fitting pressure has been completely exhausted. As one can see from FIG. 3, timer T-1 energizes the four-way holddown air valve 14 which permits air to flow for a period of 19½ seconds to the top of a bank of six holddown assemblies 11, moving the pistons downward to apply pressure on fittings 2 under test. The pressure is equal to approximately 700 lbs. on the fitting and seals the fitting against suitable rubber pads 4 in the testing block 3.

At 19½ seconds timer T-1 deenergizes the "down" portion of the four-way valve 14 permitting it to exhaust and for a fraction of a second it energizes the return portion of the four-way valve 14 causing the pistons of the holddown cylinders assembly 11 to retract to their normal "up" position. At the same time (19½ seconds) timer T-1 energizes for a fraction of a second the kickout air valve 30 which actuates a bank of six spring-return kickout cylinders 33, to eject the fittings from the testing blocks 3. Operating a kickout switch on the control panel to the "recycle" position opens the electrical circuit to the kickout air valve 30 and defeats the kickout action. The fittings will remain in the V-block for testing purposes, or for recycling the tester to stabilize the action of the sensing units. Timer T-2 controls and supplies power to delay timers T-3 and T-4.

Timer T-3 is set for a one second delay after which it energizes the three-way sensing unit air valves 24 through the normally closed contacts $27_2$, of microswitch assembly 27 and the locking relay 21. The sensing unit air valves permit air pressure to flow to the pneumatically controlled metering device 25 to charge two air circuits: (1) the fittings 2 under test in the testing blocks and Lo side of the sensing unit 26; and, (2) the reference pressure accumulator 28 and the Hi side of the sensing unit.

It is very important that the two circuits charge and exhaust equally at the same velocity to prevent serious damage to the diaphragms of the sensing units 26; and, to be of equal volume to attain the highest degree of accuracy. Flow control valves (restrictors) are used to equalize charging and exhausting actions.

After about 2½ seconds the pressure in the two air circuits will have been equalized and stabilized. The pneumatically controlled metering valve 25 will then sealoff and isolate the two circuits: (1) fitting pressure and (2) reference accumulator pressure from each other and from the supply line, trapping equal pressure on both sides of the diaphragm 60 in the sensing unit 26.

Delay timer T-4 is adjusted to close contacts $T-4_1$, $T-4_2$, for each testing assembly (and permit energization of the circuitry containing contacts $27_2$ and $27_3$) a fraction of a second after the metering valve 25 seals off and traps the equal pressures in the two air circuits—generally 4 to 5 seconds from the start of the test cycle. This is truly the beginning of the reject-sensing period which ends when timer T-2 completes its run of the test cycle at 19 seconds. This is illustrated clearly in the block diagram of the piping arrangement, FIG. 3.

With no leakage at the fitting under test, the pressure on both sides of the diaphragm of the sensing unit 26 remains stable and there is no movement of the diaphragm. This indicates the fitting is serviceable and at the end of the test cycle the fitting will be kicked out and travel down the slide 9 unrestricted to a "serviceable unit" container. Generally speaking, a small movement of the diaphragm in the sensing unit 26 actuates first sensor 62 which closes contacts $27_2$ of the microswitch 27 which, in turn, controls the opening of the trapdoor to reject a fitting. The block diagram of the piping arrangement, FIG. 3, shows a reject sensed at 10 seconds of operation of the test cycle.

When the leak is great enough to move the diaphragm sufficiently to actuate both sensors 62 and 63 of microswitch assembly 27 and thereby close contacts $27_2$ and $27_3$ respectively, the locking relay 21 is energized through coil 29 (4 to 5 seconds after the start of the cycle). At that time, it deenergizes the sensing air valve 24 through contacts $21_5$ and $21_6$ to shut off the incoming air pressure so as to conserve compressed air and relieve undue strain on the diaphragm in the sensing unit. The microswitch assembly and locking relay cannot be energized before the 4—5 second delay since timer T-4 is adjusted to close contacts $T-4_1$, which are in the line of the assembly 27, after the 4—5 second delay.

In detail, any leakage in the fitting in any one or more of the work stations causes a displacement of the diaphragm 60 in the sensing unit 26 for that or those particular work stations. A small movement of the diaphragm actuates sensor 62 to close contacts $27_2$ of microswitch assembly 27 which energizes the trapdoor air valve 42. The resultant air pressure actuates the trapdoor cylinder to open the trapdoor. As the trapdoor opens, it creates an opening in the bottom of the slide 9. The opened trapdoor forms a bottom wall between vertical partitions $a_1$, $a_2$, $a_3$, etc., which are an integral part of the slide 9, to form an isolated path for each fitting to follow as it is kicked out at the end of the test cycle. The partitions and the open trapdoor form a confined area to prevent a rejected fitting from traveling down the slide with serviceable fittings. When the fittings are kicked out, at the end of the test cycle, the ones to be rejected will hit the opened trapdoor and drop down through the opening to the reject chute 10 and finally roll down to a reject container.

When a fitting 2 leaks sufficiently to cause movement of the diaphragm so as to actuate both sensors 62 and 63 and thereby close contacts $27_2$ and $27_3$ respectively, of microswitch assembly 27, sensor 62 energizes the electrical circuit to open the trapdoor as previously described, but sensor 63 will energize the locking relay 21 through contacts $27_3$ and coil 29 to shut off air supplied to the particular work station by opening contacts $21_5$ and $21_6$, and maintain an opened trapdoor for the duration of the test cycle by closing contacts $21_9$ and $21_{11}$, and maintain the relay 21 in lock position through contacts $21_1$, and $21_3$.

As is clearly seen from FIG. 4, the locking relay 21 is a three-pole, double-throw unit. One set of normally open contacts $21_1$ and $21_3$ are used as maintaining contact and keep the relay coil energized. This means that once the relay is energized by closing the normally open contacts $27_3$ associated with the sensor 63 of the microswitch assembly 27, the relay 21 will remain energized for the remainder of the test cycle, independent of the position of sensors 62 and 63 of the microswitch assembly 27.

A second set of contacts $21_5$ and $21_6$ which are normally closed, are used deenergizing for the purpose of providing a method of deenergizing the sensing unit air valve 24 when the relay 21 is energized. This is to shut off the air pressure supplied to the sensing circuitry when the leak is great; thus relieving undue strain on the sensing unit and conserving compressed air.

A third set of normally open contacts $21_9$ and $21_{11}$ are used, when energized, to provide a direct electrical path to the trapdoor valve to keep the trapdoor open for the remainder of the test cycle independent of the position of the contacts $27_2$ associated with the sensor 62.

The test cycle ends as timer T-2 shuts off, at 19 seconds, deenergizing timer T-3 and T-4. This exhausts the metering air circuits, including any energized trapdoor circuit, just a fraction of a second prior to time (19½ seconds) when timer T-1 deenergizes and exhausts the "down" section of the four-way holddown air valve 14 and energizes the "return" section of the same valve and the kickout valve 42. This allows a blast of air to return the pistons of the holddown assembly 11 to their normal "up" position and to actuate the spring-return kickout assembly 7 to eject the fittings 2 from the testing blocks 3 before the end of the test cycle at 20 seconds.

Due to the use of a properly adjusted exhaust silencer or flow restrictor in the exhaust port of the trapdoor cylinder 36, the closing action of the trapdoor is delayed for about 3 seconds. This is long enough to direct a reject fitting into the opening leading to the reject chute 10.

Referring now to FIGS. 5—8, the metering device 25 is seen to comprise a housing formed of top half (T) and bottom half (B) which together define a cavity (C) housing piston (P). Piston (P) comprises a large end 102 and small end 104 each provided with an outer peripheral groove in which is seated an O-ring 106. The piston is movable within the bounds of the cavity and the space on either side of the piston is sealed by means of O-ring 106 so that no leakage of fluid can occur. Keeping the spaces separate is important in the functioning of the valve as is set out more fully below.

The large cavity area 108 facing large piston end 102 communicates with the small cavity area 110 facing small piston end 104 by the conduits 112 and 118 shown in FIG. 7. Conduit 112 leads from large area 108 through chamber 116 past check valve 109 to small area 110. Conduit 118 leads from large area 8 past needle valve 114 to small area 110. The purpose of the needle valve is to adjust the rate of flow of pressurizing fluid so that the equilibrium point wherein the faces of piston (P) are under equal pressure will be reached in a preselected delayed time interval. In this respect, it is noted that pressurizing fluid such as air is initially fed to a closed system by means of the metering device and it is desirable to allow a time delay from the initial pressurizing to the filled or "equilibrium" point.

Area 110 also communicates with the exterior of the valve unit through conduits 120, 122, 124, 126 and 130. Conduit 120 (FIG. 5) serves as a pressurizing fluid inlet and is connected to valve 24. Conduit 126 (FIG. 6) leads to the fitting being tested and has a branch 122 which communicates with the portion of the sensor 26 above diaphragm 60. Conduit 124 lead to the opposite side of the sensor 26 to establish equal pressure in the sensor before the system is isolated by the upward movement of the piston. Conduit 130 (FIG. 5) leads from the exterior to small valve area 110.

Thus, when fluid is introduced, through the conventional three way valve 24 attached to conduit 120, it flows into small area 110 forcing piston (P) to its down position (into large area 108). The fluid admitted via conduit 120 will pass to the test item via conduit 126 and simultaneously will pass to both sides of the sensor via conduits 122 and 124. Of course, it is possible to use a sensor other than the differential pressure type in which case, it would be necessary to have only one conduit supplying fluid to the sensor which would transform a change in pressure in the fitting to physical movement corresponding to movement of the actuator plate 61.

Conduit 130 allows fluid to escape until piston (P) moves to its upward position (into small area 110) due to the greater pressure on large piston head 102. The valve and function of the valve is now apparent since once the piston is in its upward position the inlet 120 and the outlet 130 are sealed off and each branch of the system is isolated from the other branch with the equilibrium pressure for testing established. The time delay between initial supply of fluid and equilibrium is achieved by use of needle valve 114 which is adjusted to allow a slow leakage of fluid from small area 110 via conduit 118 into large area 108 (See FIG. 7) where the bias of spring 132 is gradually overcome as pressure on piston (P) at 102 increases. Flow via conduit 112 is prevented by check valve 109 (a one way valve).

Once the system is sealed the leakage of fluid from the test item will result in movement of the diaphragm in the pressure sensor which movement is converted to an electrical signal as previously described. A suitable sensor is described in U.S. Pat. No. 3,028,750, although any equivalent means is possible.

When the test period is completed, the system is to be exhausted. The supply pressure is turned off and the system leaks through the three way valve 24 used to supply air to the valve. Pressurizing fluid may be dumped through check valve 109 once pressure is released due to said leakage. A suitable three way valve for connection via conduit 120 is shown in U.S. Pat. No. 3,359,785, but any equivalent may be used; thus, with no air being supplied the entire pressurized system is released via inlet 120 and once the piston (P) returns to its downward position, fluid may also escape via conduit 130.

The assembly of the valve will now be described in an effort to further illustrate the construction thereof. Dowel pins 140 are inserted into piston top (T) and spring 132 is placed in small area 110 of (T). Two dowel pins 140 may be steel pins approximately ⅛ inch in outer diameter (OD) and 2 inches long. Spring 132 is a steel spring about 1¼ inch long and about ½ inch OD formed at 18 gauge steel wire. Small cavity 110 is about 1¾ inch in diameter. Next, piston (P) is assembled by securing large and small parts 102 and 104 with brass stove bolt 142 which is ½ inch long. The piston parts are formed of aluminum except for cap 145 which is a polyurethane disc about 1½ inch in diameter and ¼ inch thick. O-rings 106 are lubricated and slipped in grooves on piston parts 102 and 104.

The piston is then lubricated and placed in the cavity of piston block (T). Piston block parts (T) and (B) are aluminum elements about 1 inch thick and 5 inches square. When inserting the piston, care must be taken to insure spring 132 straddles bolt 142. Next, O-rings 148 are inserted in block bottom (B). Check valve 109 is then inserted with lubrication applied. Blocks T and B are next joined by sliding together with dowel pins 140 guiding the juncture. The block is next fastened by inserting bolts 143 which are steel bolts about 1½ inches long. Needle valve 114 is inserted in block (B) by screwing in with sealing compound applied to the threads.

With the valve now assembled, the pressure sensor may be attached as well as the line to the test item and to the three way valve on the fluid supply line.

The preferred embodiment being illustrative only, the invention is limited only by the scope of the appended claims.

I claim:
1. A pipe fitting tester including:
    a. a battery of testing blocks adapted to receive fittings to be tested;
    b. means for releaseably securing fittings to be tested in said blocks;
    c. means connecting a source of fluid pressure to said blocks in a manner to communicate fluid from said source to the interior of fittings to be tested received in said blocks;
    d. a battery of pressure-sensing units associated with each testing block;
    e. means for metering fluid pressure to each said sensing unit over a control time span and isolating each said sensing unit at the end of said time span;
    f. means for automatically ejecting fittings from said testing blocks a predetermined time after isolation of said sensing units; and
    g. a slide means positioned to receive the ejected fittings having therein a means responsive to a change in fluid pressure after isolation in each said sensing unit for selectively trapping fittings ejected from the box associated with the unit sensing a pressure change.
2. A tester as defined in claim 1 wherein a battery of said fluid pressure connecting means are independently connected to the sensing units associated with each testing block respectively.
3. A tester as defined in claim 2 wherein each said sensing unit includes a chamber divided by a diaphragm which is balanced by equal pressure metered to each side thereof during said time span, said isolating means isolating one portion of the chamber divided by the diaphragm from the other.
4. A tester as defined in claim 1 further including a control system having means for automatically actuating said securing means for a predetermined time, delaying any response by said trapping means for a predetermined time after said actuating, and synchronizing said ejecting means with release of said securing means.
5. A pipe fitting tester including:
    a. a battery of testing blocks adapted to receive fittings to be tested;
    b. means for releasably securing fittings to be tested in said blocks;
    c. means connecting a source of fluid pressure to said blocks in a manner to communicate fluid from said source to the interior of fittings to be tested received in said blocks;

d. a battery of pressure sensing units associated with each testing block;
e. means for metering fluid pressure to each said sensing unit over a control time span and isolating each said sensing unit at the end of said time span;
f. means for automatically ejecting fittings from said testing blocks a predetermined time after isolation of said sensing units;
g. means responsive each said sensing unit for selectively trapping fittings ejected from the blocks associated with the units sensing a pressure change; and
h. wherein the time span of said metering means is controlled pneumatically.

6. A pipe fitting tester including:
a. a battery of testing blocks adapted to receive fittings to be tested;
b. means for releasably securing fittings to be tested in said blocks;
c. means connecting a source of fluid pressure to said blocks in a manner to communicate fluid from said source to the interior of fittings to be tested received in said blocks;
d. a battery of pressure sensing units associated with each testing block;
e. means for metering fluid pressure to each said sensing unit over a control time span and isolating each said sensing unit at the end of said time span;
f. means for automatically ejecting fittings from said testing blocks a predetermined time after isolation of said sensing units;
g. means responsive to a change in fluid pressure after isolation in each said sensing unit for selectively trapping fittings ejected from the blocks associated with the units sensing a pressure change; and
h. a second means responsive to an increased change in fluid pressure in each said sensing unit activating a fluid metering means associated with a unit sensing such an increased fluid pressure change.

7. A pipe fitting testing including:
a. a battery of testing blocks adapted to receive fittings to be tested;
b. means for releasably securing fittings to be tested in said blocks;
c. means connecting a source of fluid pressure to said blocks in a manner to communicate fluid from said source to the interior of fittings to be tested received in said blocks;
d. a battery of pressure sensing units associated with each testing block;
e. means for metering fluid pressure to each said sensing unit over a control time span and isolating each said sensing unit at the end of said time span;
f. means for automatically ejecting fittings from said testing blocks a predetermined time after isolation of said sensing units;
g. means responsive to a change in fluid pressure after isolation in each said sensing unit for selectively trapping fittings ejected from the blocks associated with the units sensing a pressure change; and
h. said metering means including a stepped chamber, a movable piston positioned within said chamber, said piston having a relatively large piston head on one end and a relatively small piston head on the opposite end, said piston being movable between a position wherein one of said piston heads seals said chamber from outside pressure and a position wherein the other said piston head permits fluid pressure within said chamber.

8. A tester as defined in claim 7 wherein the area within said stepped chamber facing the large piston head communicates with the area within said chamber facing said small piston head.